United States Patent
Dickson et al.

(10) Patent No.: US 11,713,548 B2
(45) Date of Patent: Aug. 1, 2023

(54) CONCRETE RODDER AND METHODS OF USE AND MANUFACTURE OF SAME

(71) Applicants: Dale Dickson, Oakland, OR (US); Devan Dickson, Oakland, OR (US)

(72) Inventors: Dale Dickson, Oakland, OR (US); Devan Dickson, Oakland, OR (US)

( * ) Notice: Subject to any disclaimer, the term of this patent is extended or adjusted under 35 U.S.C. 154(b) by 577 days.

(21) Appl. No.: 16/837,198

(22) Filed: Apr. 1, 2020

(65) Prior Publication Data
US 2020/0325641 A1 Oct. 15, 2020

Related U.S. Application Data

(60) Provisional application No. 62/831,625, filed on Apr. 9, 2019.

(51) Int. Cl.
| | |
|---|---|
| *E01C 19/44* | (2006.01) |
| *E04G 21/10* | (2006.01) |
| *E04F 21/24* | (2006.01) |
| *B29C 70/68* | (2006.01) |
| *B29C 70/76* | (2006.01) |
| *B29C 70/34* | (2006.01) |

(Continued)

(52) U.S. Cl.
CPC .............. *E01C 19/44* (2013.01); *B29C 70/34* (2013.01); *B29C 70/683* (2013.01); *B29C 70/763* (2013.01); *E04F 21/241* (2013.01); *E04G 21/10* (2013.01); *B29K 2309/08* (2013.01); *B29K 2705/00* (2013.01); *B29K 2711/14* (2013.01); *B29L 2031/008* (2013.01); *B29L 2031/28* (2013.01)

(58) Field of Classification Search
CPC ........ E01C 19/44; E04F 21/241; E04G 21/10; B29C 70/34; B29C 70/683; B29C 70/763; B28K 2309/08; B28K 2705/00; B28K 2711/14; B29L 2031/008; B29L 2031/28
USPC ...................... 404/75, 83, 114, 118; 15/235.6
See application file for complete search history.

(56) References Cited

U.S. PATENT DOCUMENTS

| | | | | |
|---|---|---|---|---|
| 3,460,183 A | * | 8/1969 | Harrington | ............. E04F 21/06 403/384 |
| 4,253,214 A | * | 3/1981 | Bushee | ................... E04F 21/06 15/235.4 |

(Continued)

FOREIGN PATENT DOCUMENTS

WO    WO 2016206675    *    6/2016    .............. E04F 21/16

OTHER PUBLICATIONS

Kraft Tool, Kraft Tool CC814 Walking Magnesium Concrete Float 24" x 3.25", posted at amazon.com, published Jan. 6, 2011, © 1996-2020, Amazon.com, Inc, or its affiliates, [online], [site visited Apr. 30, 2020], 3 pages. Available from Internet, <https://www.amazon.com/Kraft-Tool-CC814-Magnesium-Concrete/dp/B00414LFU8/ref=sr_1_5?dchild=1&keywords=bull+float&qid=1588291912&sr=8-5>.

*Primary Examiner* — Raymond W Addie
(74) *Attorney, Agent, or Firm* — Howard Russell (57) ABSTRACT

Apparatus and method for screeding/rodding concrete (and method of manufacture of the same), comprising: a rigid base member configured to comprise a tight tolerance of levelness along its length, and a mounting structure for securely attaching a working layer; attachment of a preferably fiberglass working layer comprising a durable material deposited on the rigid base member and capable of being finished to a smooth surface suitable for advantageous direct contact with poured wet concrete.

7 Claims, 10 Drawing Sheets

(51) Int. Cl.
*B29K 705/00* (2006.01)
*B29K 711/14* (2006.01)
*B29K 309/08* (2006.01)
*B29L 31/00* (2006.01)
*B29L 31/28* (2006.01)

(56) References Cited

U.S. PATENT DOCUMENTS

| | | | |
|---|---|---|---|
| 4,641,995 A * | 2/1987 | Owens | E04G 21/10 404/97 |
| 5,324,085 A * | 6/1994 | Hintz, Jr. | E04F 21/06 15/235.4 |
| 5,605,415 A * | 2/1997 | Shamblin | E04F 21/241 404/97 |
| 5,609,437 A * | 3/1997 | Silva | E04F 21/04 404/97 |
| 6,488,442 B2 * | 12/2002 | Boudreaux, Sr. | E04F 21/241 404/97 |
| 6,728,994 B1 * | 5/2004 | Rushin, Jr. | E04F 21/241 16/436 |
| 7,192,216 B2 | 3/2007 | Casale | |
| 7,478,973 B2 * | 1/2009 | Brotzel | E04F 21/161 404/118 |
| 8,152,409 B1 | 4/2012 | Ligman | |
| 8,419,313 B2 | 4/2013 | Lura | |
| 10,352,005 B1 * | 7/2019 | Mendendorp | E01C 19/44 |
| 2006/0192073 A1 * | 8/2006 | Casale | E04G 21/10 249/188 |
| 2007/0206992 A1 * | 9/2007 | Brotzel | E01C 19/44 15/235.4 |
| 2011/0091277 A1 * | 4/2011 | Biodrowski | E04F 21/242 404/114 |
| 2012/0141204 A1 | 6/2012 | Crouch et al. | |
| 2022/0170217 A1 * | 6/2022 | Frost | E04F 21/241 |

* cited by examiner

Create rigid base member with high degree of straightness (e.g., out of wood or aluminum). — 110

Provide means of securely attaching a working layer (e.g., with box or dove-tail joint). — 112

Add the working layer (e.g., by forming or painting fiberglass onto the base member). — 114

CONCRETE RODDER AND METHODS OF USE AND MANUFACTURE OF SAME

CROSS-REFERENCE TO RELATED APPLICATIONS

The present patent application claims the priority and benefit of U.S. Patent Application No. 62/831,625, filed 9 Apr. 2019.

FIELD OF THE INVENTION

The present invention relates to a tool for rodding concrete for preparing concrete surfaces, and in particular to an improved tool, and method of use and manufacture of the same, for rodding for preparing concrete surfaces, including among others ramps that conform to tight specifications for flatness and surface finish, with application to ramps conforming to specifications in the Americans with Disabilities Act (ADA).

BACKGROUND OF INVENTION

Concrete finishing involves a multi-step process comprising designing appropriate slopes, setting forms, specifying the concrete mix, and pouring the concrete into the form. Thereafter, screeding/rodding has been performed with a long piece of lumber, or an aluminum rod, to "knock down" a concrete pour to eliminate air pockets, to distribute rocks, and to level the surface. Once rodding has been completed, floating, for example with a bull float, has been employed to ensure a smooth and durable finish layer. This, post-rodding process has been primarily accomplished by passing a float over concrete already leveled by rodding in order to have raised the "cream" of the concrete to the surface to have cured minor imperfections in the smoothness of the surface left after rodding. Finally, brushing the floated, and thus smoothed, concrete has been employed to create a non-slip surface, after which appropriate curing has been required.

The process of screeding/rodding is time critical, in that it has needed to be accomplished relatively quickly while the concrete has still been in a state that it has been able to be effectively "knocked down" from a raw pour without undue surface imperfections, non-level condition, or lack of sealing. Rodding has required physical working of the concrete by skilled workers, often one person standing at each end of dimensional lumber, such as a 2×4. However, a non-optimum process of rodding, such as for example with a warped piece of lumber, a common occurrence, has resulted in out-of-tolerance surfaces. An ideal rodding process has resulted in minimal need for additional floating, which can introduce undesirable, and even unacceptable, variations in slope.

As a result of ineffective rodding, with our without good-quality rodding tools, many thousands of dollars have been lost on job sites having needed re-done concrete finish work that has been completed out of specified tolerances (e.g., a mere 2% to 2.1% variance in an ADA ramp's slope will cause the ramp to be considered out of tolerance). And, if such a ramp fails inspection, usually the only available remedy has been to tear out the non-conforming section and repeat the entire process from the beginning. Again, this has led to a great deal of lost time and money for concrete finishers and businesses alike.

Prior art rodding tools have been comprised of one material, primarily dimensional lumber, which as mentioned above, has been subject to warping and other surface imperfections. Such has led to out-of-tolerance concrete finish work. Thus, reasonably priced rodding tools, for example made of wood, have not held their straightness during the process of rodding working the concrete. Accordingly, aluminum tools have been used as a result, but these have been unduly expensive.

Still further, some alternatives in other concrete working contexts, other than rodding, have been employed where an insert of magnesium has been used to reduce costs. But, such has not been employed with rodding, but rather only with floating.

Further, rodding has been a notoriously difficult and labor-intensive process. Therefore, improvements in the tools used for rodding which make the job easier physically to manage, both for the rodding process and the floating process (it being the case that more effective rodding leads to an easier job floating), would be welcomed by concrete finishers.

Thus, to date, traditional tools for screeding/rodding have required additional work with floats to create a durable surface layer free of rocks. Further, it is well-known that the more one has worked the surface of concrete, that is, the more labor that has been expended finishing the concrete, the more likely it has been that the surfaces have been out of tolerance, and thus they have required very experienced operators to perform such concrete finishing operations. It is well understood in the industry that concrete finishing is best with minimal working of the surface. Therefore, there has been needed a tool that accomplishes the required screeding and leveling of the concrete, while moving easily over the surface of the concrete, easing the physical requirement of working the concrete. It is known that the process of rodding serves to push the rocks below the surface of the concrete without creating holes in the surface, and this, in turn, results in a quicker, less physically demanding process of screeding/rodding, which also, in turn, reduces the need for further working and floating of the surface.

It is well-known in the industry that prior art methods of rodding using completely wooden, or completely metal, rodder apparatus have required on average three pulls of concrete towards a user's, or users', feet, which process is repeated with the user, or users, taking a step back rearwardly and pulling again and average of three times. And this process is well-known to be repeated on average three pulls per rearward step, until the entire formed surface has been rodded. This has been a very labor-intensive process, even sometimes requiring multiple persons working on a single such prior art rodder apparatus.

Further, it is well-known in the industry that once the process of rodding is thus completed, a bull floating device is used to continue substantial smoothing of a concrete surface that is newly formed by the rodding and bull-floating steps.

SUMMARY OF THE INVENTION

In accordance with an aspect and embodiment of the disclosure, there is provided an apparatus for rodding concrete where the surface of the apparatus adapted to be in direct contact with the concrete is adapted for smooth working of the concrete. Such an apparatus may be beneficially adapted, for example, for use in creating concrete ramps or slabs with tight tolerances for slope and flatness. The apparatus comprises a rigid base member arranged for maintaining a tight tolerance of levelness along its length, and an additional working layer surface on the rigid base member and comprising a durable material capable of being finished to a smooth surface suitable for direct contact with poured wet concrete.

In one aspect and embodiment of the disclosure, the working layer consists of a cured fiberglass compound, where the working layer has been smoothed to a very smooth and consistent surface that is used in direct contact with the concrete being leveled. The fiberglass compound is applied on the rigid base member using methods common to the industry of applying fiberglass, whether with painting it on or putting it in a mold on the base member, and it is cured and smoothed to conform to the tight tolerance of level needed along the length of the rigid base member.

The working layer surface is a material that covers the length and width of the rigid base member in the portion of the tool that is in direct contact with the concrete.

In another aspect and embodiment of the disclosure, the rigid base member comprises a wood 2×4 that is adapted for tight tolerances of straightness and is also adapted for secure attachment of the working layer on the rigid base member. The use of a wood 2×4 for rodding concrete is common in the industry, and the shape and feel of the wood 2×4 is familiar to those performing the rodding function. In accordance with this aspect and embodiment, the wood 2×4 is adapted in two ways:

The wood 2×4 is planed or routed along the length of its narrower surface to provide a high degree of straightness, consistent with the specification of flatness required, and The wood 2×4 is routed along the length of its narrower surface to provide one of a stepped surface, a groove, groove, a dovetail, or other cross-section configuration, any of which may be suitable for providing a secure surface for the addition of the working layer.

With the preparation of the rigid base member to include a stepped surface, a groove, grooves, dovetail, inverted trapezoid, etc., the working layer of a fiberglass compound is applied to that surface according to standard industry processes for layering, painting or applying fiberglass in a mold. The fiberglass compound is applied in the stepped surface, groove or dovetail in order to securely attach the working layer to the rigid base member, and the working layer is created by adding fiberglass compound to sufficient depth to cover the narrow surface of the wood 2×4.

The fiberglass compound is smoothed (as for example with sanding, or removing a mold having a smooth inner surface) in conformance with the high degree of straightness of the rigid base layer, and cured to a degree of hardness suitable for rodding of a concrete pour with the rodding tool. The final shape of the apparatus resembles the original wood 2×4, but with the lower portion comprised of smooth and cured fiberglass. The working layer comprised of cured fiberglass is adapted with a durable and smooth surface to reduce tearing of the concrete surface while performing the rodding function.

In another aspect and embodiment of the disclosure, the shape of the working layer may be adapted to be more rounded (as in a more rounded cross section such as a roughly semi-circular cross section working layer) than the shape of a wood 2×4, while preserving the straightness along the length of the apparatus, and this may also facilitate easier rodding. This may be accomplished by sanding or using a mold along the base of the base member (wood 2×4, rectangular aluminum rod, etc.).

In another aspect and embodiment of the disclosure, the rigid base member comprises a sturdy construction of plyboard or other processed structural wood, cut and glued to a similar size and shape as a wood 2×4. Such a construction may be inherently straighter than a commercially available wood 2×4, allowing for efficient construction of the rigid base member. A rigid base member comprising a construction of plyboard or other processed structural wood also may be adapted for the application of the working layer by having routed along the length of its narrower surface one of a stepped surface, a groove, and a dovetail.

In another aspect and embodiment of the disclosure, the rigid base member comprises a 2×4-shaped rod of aluminum or other lightweight metal having a structure similar in size and shape to a wood 2×4, adapted with an area to provide a convenient and comfortable grip for the worker to hold and manipulate the tool, further adapted with a secure mounting structure for the fiberglass working layer, and further comprising a fiberglass working layer attached along the narrower surface of the aluminum rod adapted for contacting the concrete during rodding. The application and curing of the fiberglass compound is then performed on the mounting structure of the aluminum rod.

In another aspect and embodiment of the disclosure there are provided optional endcaps, preferably composed of a metal, which attach adjacent the ends of the improved rodding tool, which cover the connecting joint attaching the working layer and the rigid base member of the improved rodding tool. Each optional endcap may have at least one hole, but preferably a plurality of holes, through the endcap, which permits a user to use a fastener, such as a flathead screw, to partially pass through the hole(s) in order to attach the endcap to the improved rodding tool.

In accordance with another aspect of the disclosure, there is provided an improved efficiency method of rodding a freshly-poured concrete pour within a form having first and second ends to form a smooth concrete surface before drying and curing of the concrete, comprising the steps of:

standing in or near the freshly poured concrete near the first end of the form while holding an apparatus for rodding concrete, the apparatus comprising:
a rigid base member arranged for maintaining a tight tolerance of levelness along its length, adapted for connecting an additional working layer surface; and
a working layer on the rigid base member, comprising a durable material capable of being finished to a smooth surface suitable for direct contact with poured wet concrete;

extending the user's arms to reach and engage in contacting relationship the working layer's durable material on the apparatus to the poured wet concrete;

retracting the user's arms to pull the working layer's durable material partially within and along an upper surface of the poured wet concrete such that the concrete is smoothed by the durable material as it is pulled toward the user's feet;

taking a step rearwardly toward the second end of the form; and repeating the previous three steps of the process a minimal number of times to achieve a sufficiently smooth surface able to be successfully bull floated with a substantially lesser degree of effort compared to had the surface been rodded using a completely wooden, or completely metal, apparatus.

The improved efficiency method of this aspect of the disclosure is such that wherein the number of pulls to achieve the sufficiently smooth surface may be reduced by approximately one third as compared to the number of pulls necessary to achieve the same result with an average skilled and strength person, or person, using prior art methods.

Further, the method of this aspect of the disclosure is such that wherein the substantially lesser degree of effort to successfully bull float comprises approximately 50% less effort when compared with the effort necessary to successfully bull float by an average skilled and strength person using prior art methods.

In accordance with another aspect of the disclosure, there is provided an improved efficiency method of producing an improved rodding tool of present embodiments, comprising the steps of:

creating a mold having the desired length and shape for the fiberglass working layer;

acquiring and preparing fiberglass material strips to a desired length and width, for example about 1.5 inches wide, and as long as the desired end-product improved rodder device;

pouring a fiberglass liquid component into the mold, where the liquid component may further comprise a resin;

laying individual strips (for example about eight, or preferably eight, such strips) of fiberglass material into the liquid component within the mold;

compressing the entire length of the dovetail cut portion of the rigid base member into the mold to contact combined liquid and fiberglass strips;

holding in place the rigid base member to ensure the fiberglass liquid component oozes into the dovetail groove; and allowing the fiberglass to harden and removing the mold.

It will be appreciated by those skilled in the art that there are various possible combinations of the above-described elements and sub-elements for various embodiments of the invention, whether such elements and sub-elements be combined in whole or in part, which may be employed without departing from the scope and spirit of the invention as claimed.

The subject matter of the present invention is particularly pointed out and distinctly claimed in the concluding portion of this specification. However, both the organization and method of operation, together with further advantages and objects thereof, may best be understood by reference to the following descriptions taken in connection with accompanying drawings wherein like reference characters refer to like elements.

DETAILED DESCRIPTION

Referring to FIGS. 1A-2B, 2A-2B, 3A-3B, 9A-9B, in accordance with one or more aspects of the disclosure, there is provided an apparatus comprising: a rodding assembly 100, 100', 100", 200 comprising a rigid base member 102, 102', 102", 200 further comprised of one of a 2×4 piece of lumber, aluminum, or other suitable wood, metal, or plastic member, adapted with a mounting geometry 104, 104' 104", 204 such as a routed box, or stepped, joint portion, and a working layer 106, 106', 106", 206, which working layer is adapted to be securely attached to the rigid base member as with painting, coating, or otherwise forming in a form or mold, fluid fiberglass material.

Figures 1A, 1B:
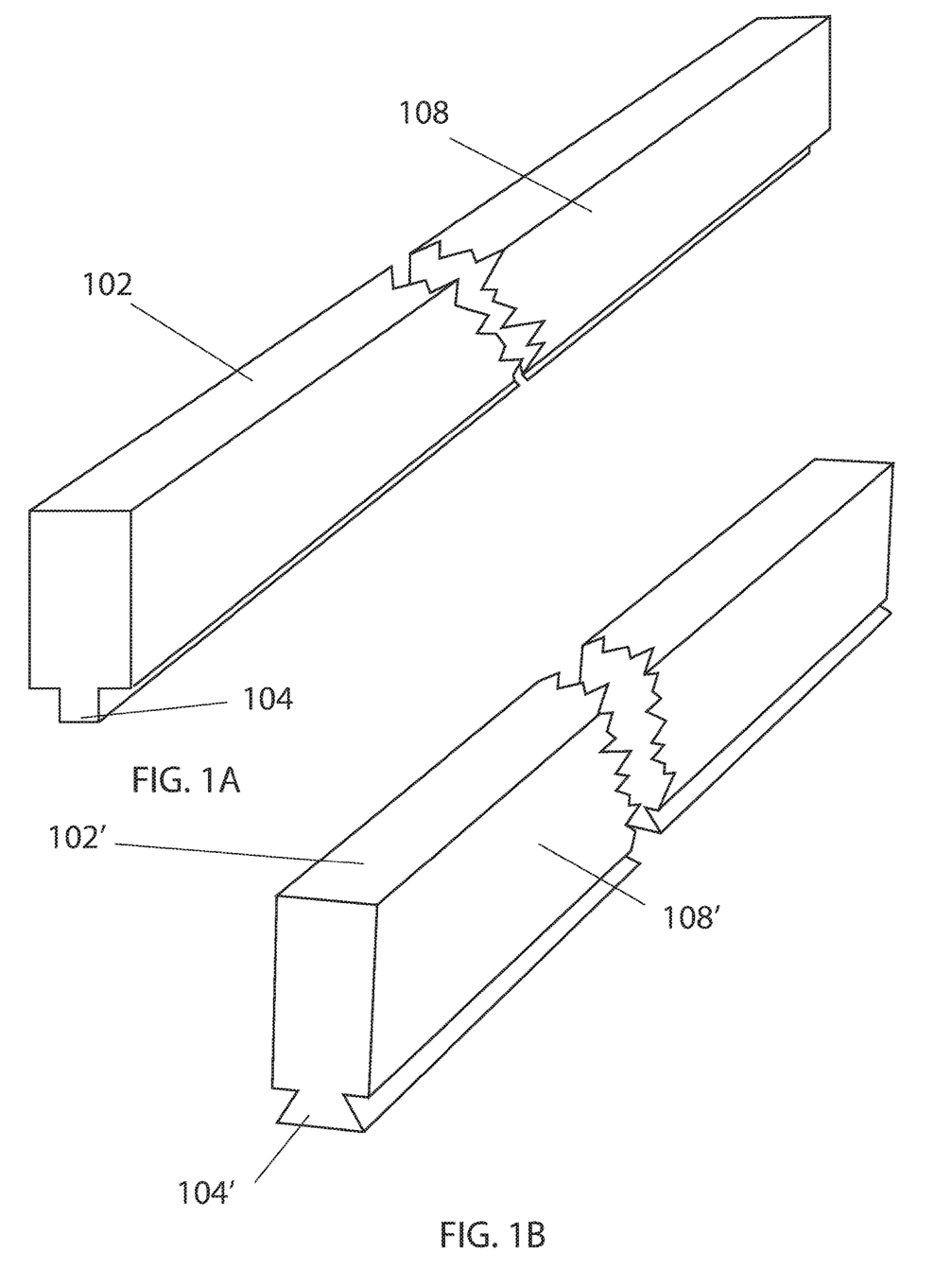
FIG. 1A is a perspective view of the rigid base member prior to application of the working layer, showing an example of routing a box-joint-type pattern, or a stepped pattern, in a narrow side suitable for securely attaching the working layer.
FIG. 1B is a perspective view of an alternate rigid base member prior to application of the working layer, showing example of routing a different pattern, such as a dove-tail joint pattern, in the narrow side suitable for securing attaching the working layer.
Figures 2A, 2B:
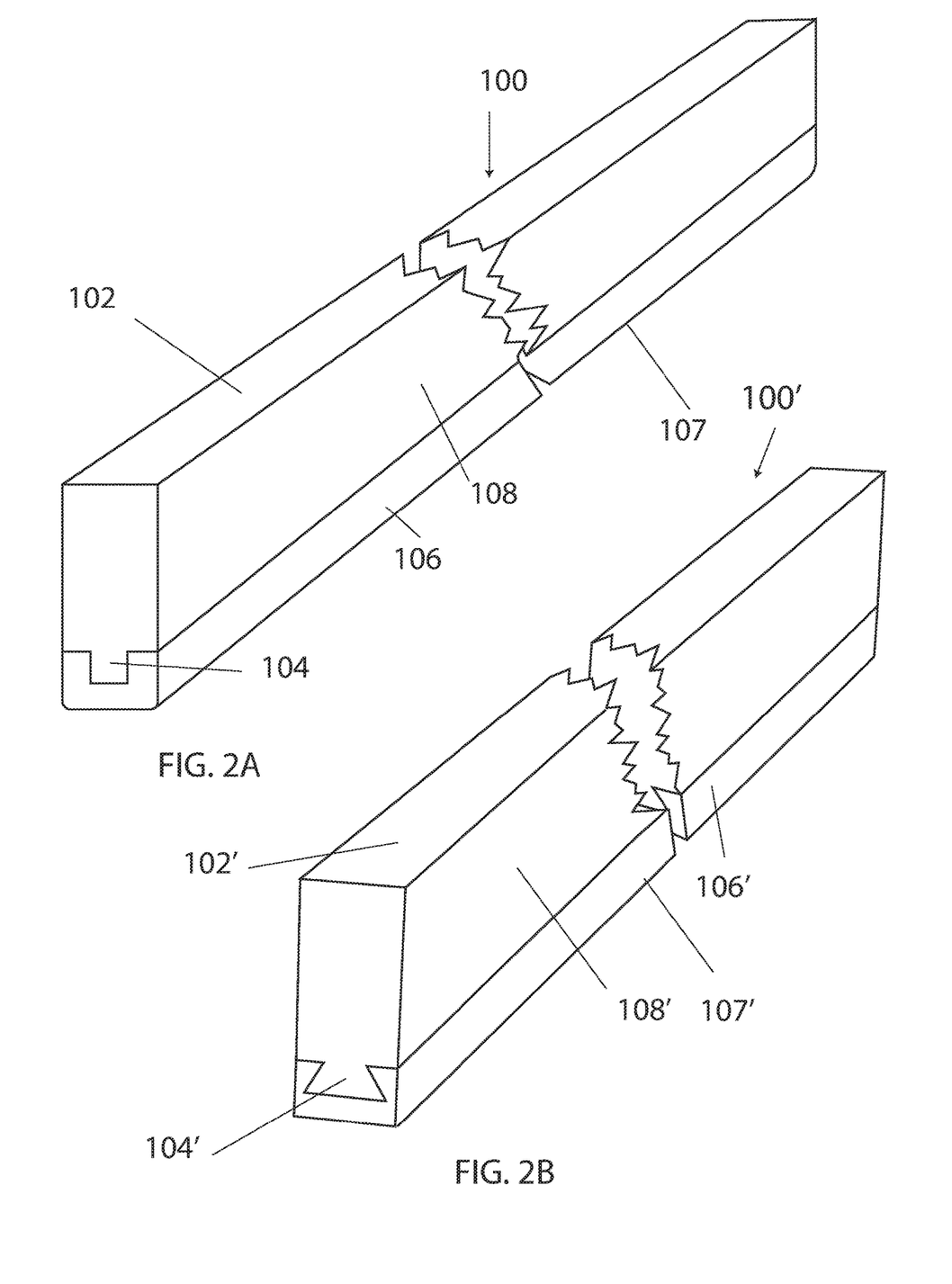
FIG. 2A is a perspective view of the rigid base member of FIG. 1A, where the working layer has also been added, and wherein the working layer has slightly rounded corners for easier concrete rodding.
FIG. 2B is a perspective view of the alternate rigid base member of FIG. 1B, where the working layer has also been added.
Figures 3A, 3B:
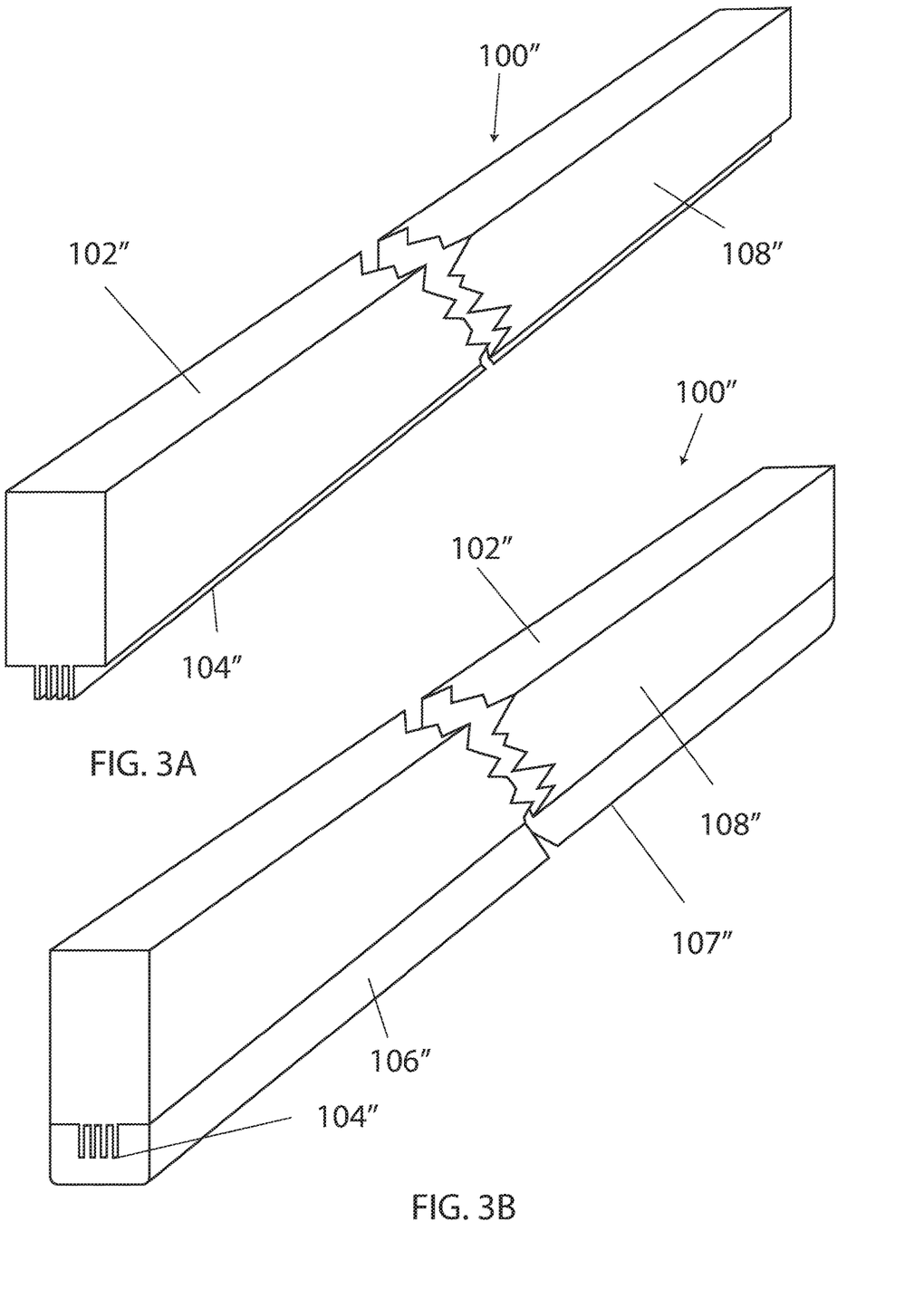
FIG. 3A is a perspective view of another alternative rigid base member comprising a metal rod, showing an example of a mounting area, such as grooves or fins, suitable for securely attaching the working layer.
FIG. 3B is a perspective view of the alternative rigid base member of FIG. 3A where the working layer has been added with slightly rounded lower edges.
Figure 4:
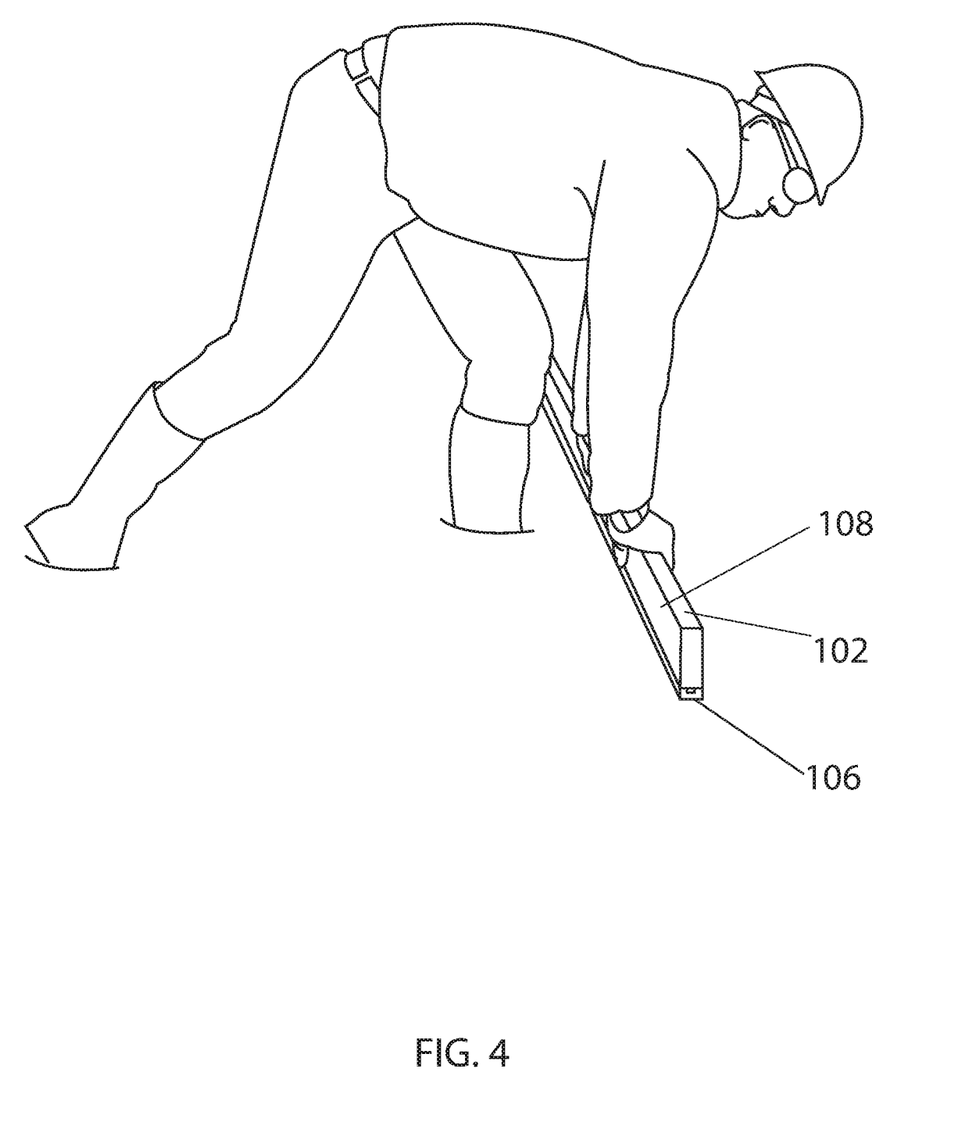
FIG. 4 is a perspective view of a rodder in accordance with an aspect and embodiment of the disclosure and in use as a rodding tool in a typical application.
Figures 9A, 9B:
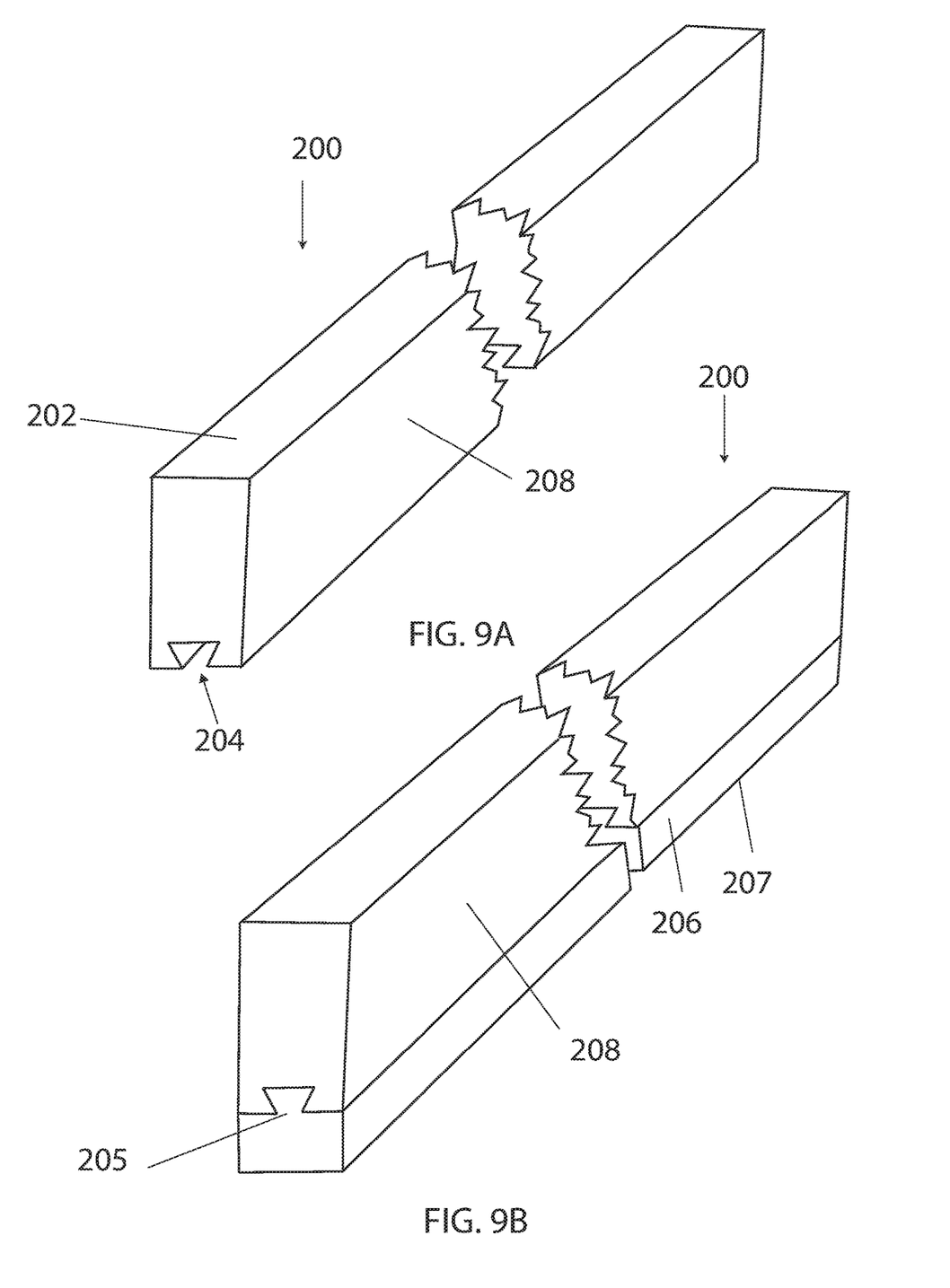
FIG. 9A is a perspective view of another embodiment of a rigid base member prior to application of a working layer, showing an example of routing an inverted dovetail groove along the rigid base member, suitable for attaching the working layer.
FIG. 9B is a perspective view of the rigid base member of FIG. 9A, with the working layer also added.

In accordance with an embodiment of the disclosure shown in FIG. 4, it is noted that any of the rodding assemblies of this disclosure, e.g., rodding assembly 100 of FIGS. 1A-1B, 100' of FIGS. 2A-2B, 100" of FIGS. 3A-3B, and 200 of FIGS. 9A-9B, may be so used as shown in FIG. 4, and each is intended to be used with a narrow side (e.g., 106) down, providing a secure handhold broader surface (e.g., 108) on the upper narrow wood (or other suitable material) portion (e.g., 102), for the worker in moving and pulling the wet concrete as part of the rodding process. Thus, the design of this tool allows the worker skilled in the art to utilize the same motion and process for rodding that has previously been learned.

Referring to FIGS. 1A-1B, 2A-2B, 3A-3B, and 9A-9B, the mounting geometry 104, 104', 104", 204, respectively may be realized with any of a number of different shapes (rectangular box, or stepped, cut 104, dove-tail cut 104', 204, or dado-cut-fins/otherwise formed grooves 104"), with the effect to provide a secure mounting point for the working layer 106, 106', 106", 206.

Referring specifically to FIG. 2A, the working layer 106 is securely attached to the rigid base member 102, utilizing the mounting geometry 104 in the form of a rectangular box, or stepped, cut, to provide the secure attachment.

Referring specifically to FIG. 2B, the working layer 106' is securely attached to the rigid base member 102', utilizing the mounting geometry 104' in the form of a dove-tail joint cut, to provide the secure attachment.

Referring to FIGS. 2A, 2B, 3B, 9B, the external shape of the working layer 106, 106', 106", and 206 generally conforms to the original shape of the wood 2×4, other dimensional wood, or other suitable base member 102, 102', 102", 202, providing a familiar shape of the tool to the worker.

Referring to FIGS. 2A, 2B, 3B, and 9B it will be appreciated that the lower edge 107, 107', 107", 207 may be squared off as shown in FIG. 2B (107'), or slightly rounded as shown in FIGS. 2A (107) and 3B (107").

Alternatively, as shown in FIGS. 3A and 3B, the rigid base member 102" may comprise a metal 2×4 (such as aluminum), while preserving the secure handhold 108" (or 108 of FIGS. 1A-1B, 108' of FIGS. 2A-2B, or 208 of FIGS. 9A-9B), 108" for the worker and a mounting geometry 104" (e.g., cut or molded dado fins or grooves) to provide secure attachment to the working layer 106".

Figure 5:
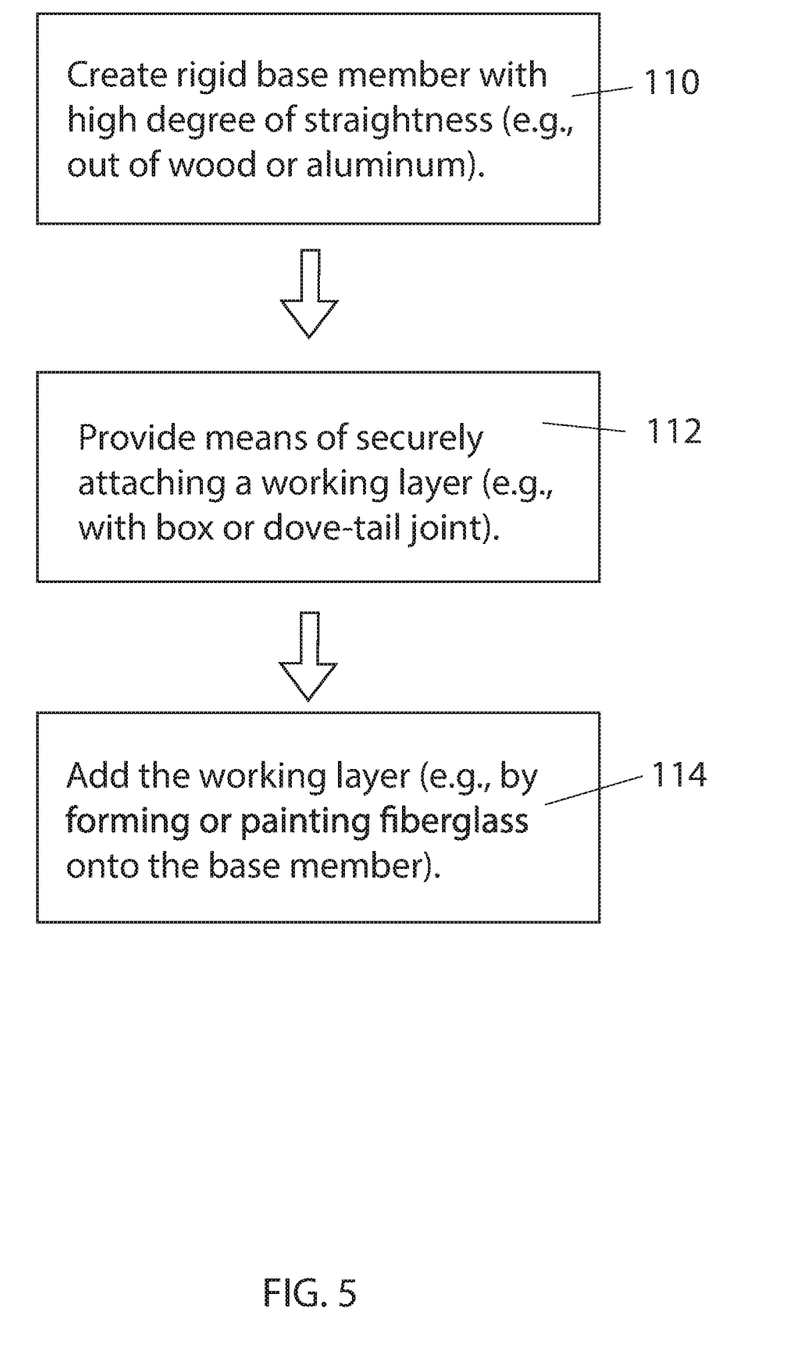
FIG. 5 is a flowchart showing the general steps involved in manufacturing a rodding tool in accordance with the disclosure.

FIG. 5 describes in general terms the process for creating the assembly for the improved rodding tool 100, 100', 100", 200, comprising the steps of:
create rigid base member with high degree of straightness (e.g., out of wood or aluminum) 110;
provide means of securely attaching a working layer (e.g., with box or dove-tail joint) 112; and
add the working layer (e.g., by forming or painting fiberglass onto the base member) 114.

Figure 6:
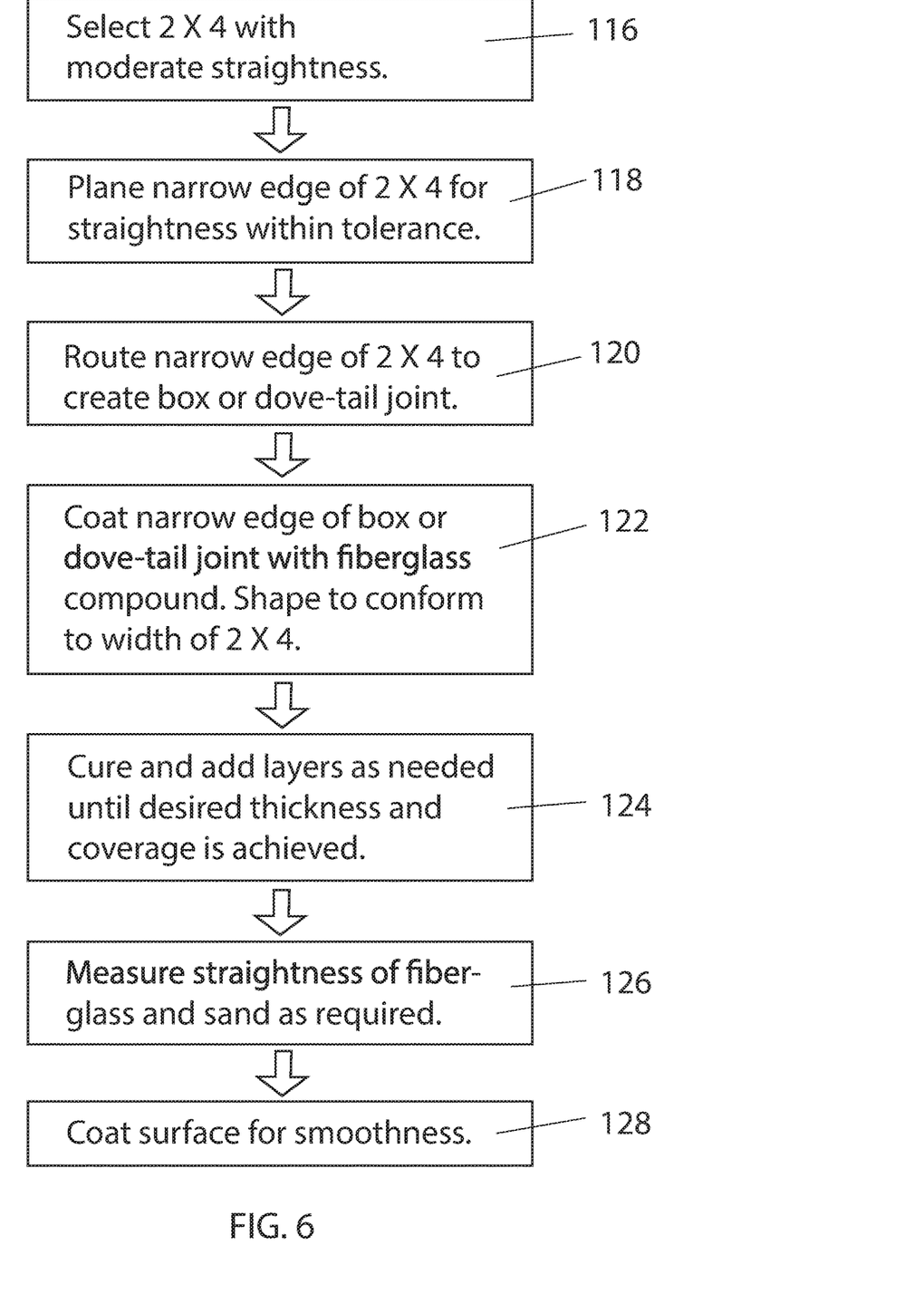
FIG. 6 is a flowchart showing specific steps involved in manufacturing a rodding tool using a wood 2×4 and fiberglass in accordance with the disclosure.

FIG. 6 describes steps to create an embodiment, comprising a wood 2×4 as the rigid base member 102, a straight and routed mounting geometry 104, 104', 204, and a fiberglass working layer 106, 106', 206, comprising the steps of:
select 2×4 with moderate straightness 116;
plane narrow edge of 2×4 for straightness within tolerance 118;
route narrow edge of 2×4 to create box or dove-tail joint 120;
coat narrow edge of box or dove-tail joint with fiberglass compound. Shape to conform to width of 2×4 122;
cure and add layers as needed until desired thickness and coverage is achieved 124;
measure straightness of fiberglass and sand as required 126; and
coat surface for smoothness 128.

It will be appreciated that a rodding tool 100, 100', 100", 200 in accordance with this disclosure provides the concrete installer with a tool that is physically less strenuous to manipulate through wet concrete than an unmodified wood 2×4, and provides a working surface in contact with the concrete that requires fewer additional finishing steps, helping to maintain flatness for demanding applications.

In an unforeseen way, fiberglass added to the bottom of the base member 102, 102', 102", 202 as described herein significantly eases the rodding/pulling of the concrete. This aspect of the invention facilitates the rodding process significantly, which heretofore has been a very strenuous labor.

In another embodiment, referring now specifically to FIGS. 9A and 9B, the connecting groove 204 of the improved rodding tool 200 may be shaped like a dovetail and machined out of the rigid base member 202, with the working layer 206 having a corresponding prominence 205 extending outward from the unfinished surface of the working layer which attaches it to the rigid base member 202. A benefit of this alternative shape is that it is easier to machine into the rigid base member 202, thereby reducing manufacturing costs and improving efficiency. The improved rodding tool 200 will have a broad surface 208 on the side suitable as a handhold for a worker using the tool to rod a freshly poured concrete surface.

Figure 10A:
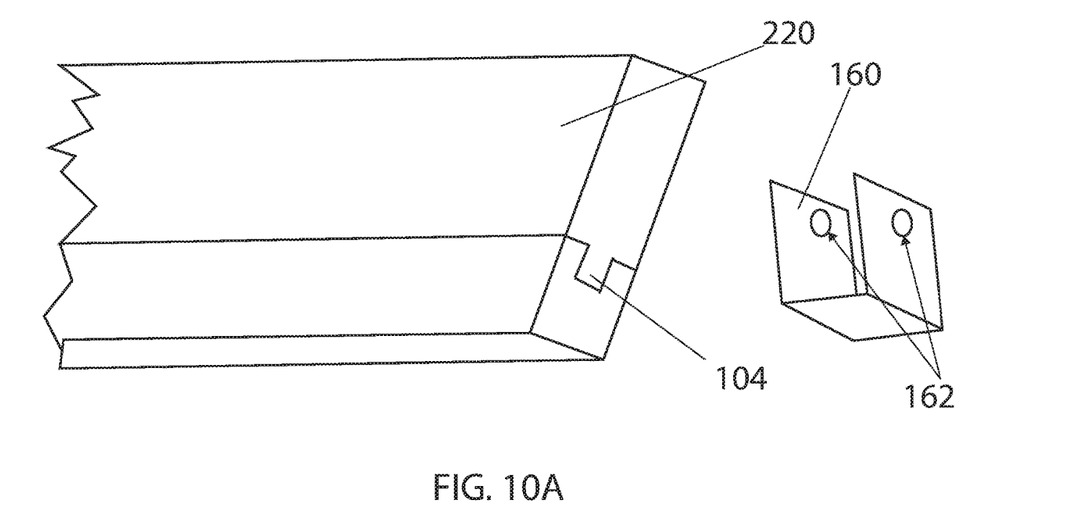
FIG. 10A is a perspective view of the rodding tool with an optional endcap which can be attached adjacent the end of the rodding tool.
Figure 10B:
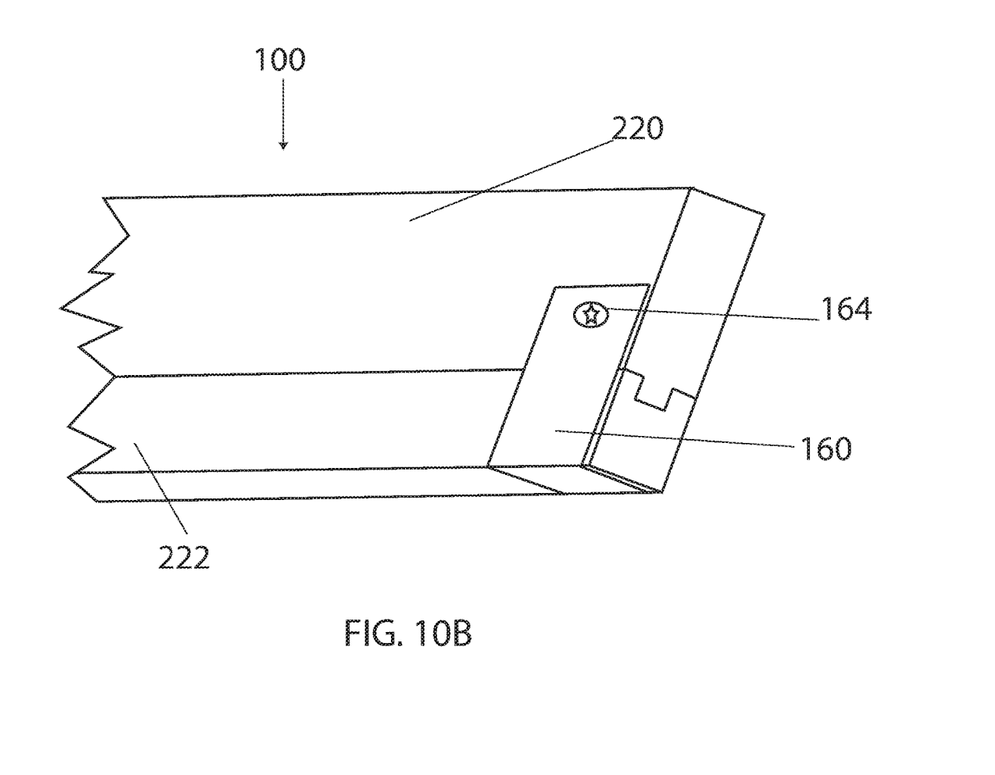
FIG. 10B is a perspective view of the rodding tool with the optional endcap attached to the rodding tool.

In another embodiment, referring now to FIGS. 10A and 10B, there may be optional endcaps 160, preferably composed of a metal, each of which attaches to an end of the improved rodding tool 100 (as shown in FIG. 10B). Each such endcap 160 covers a connecting joint mounting geometry 104, 204 attaching the working layer 202, 222 and the rigid base member 220. The optional endcaps 160 may have a plurality of holes 162 through, or defined in, them which permit them to be attached with fasteners 164, possibly flat-head screws, to partially pass through the holes thereby attach the end caps to the improved rodding tool. The endcaps may be approximately 1.5"×1.5"×1.5" in length and may serve to protect the ends of the board if it were to brush up against a curb or other hard surface, which could potentially disturb the connection between the working layer and the rigid base member. The endcaps also serve other functions such as reducing the need for sanding of the edge of the rodding tool, and preventing the smooth fiberglass layer from becoming rough at the edges.

Figure 7:
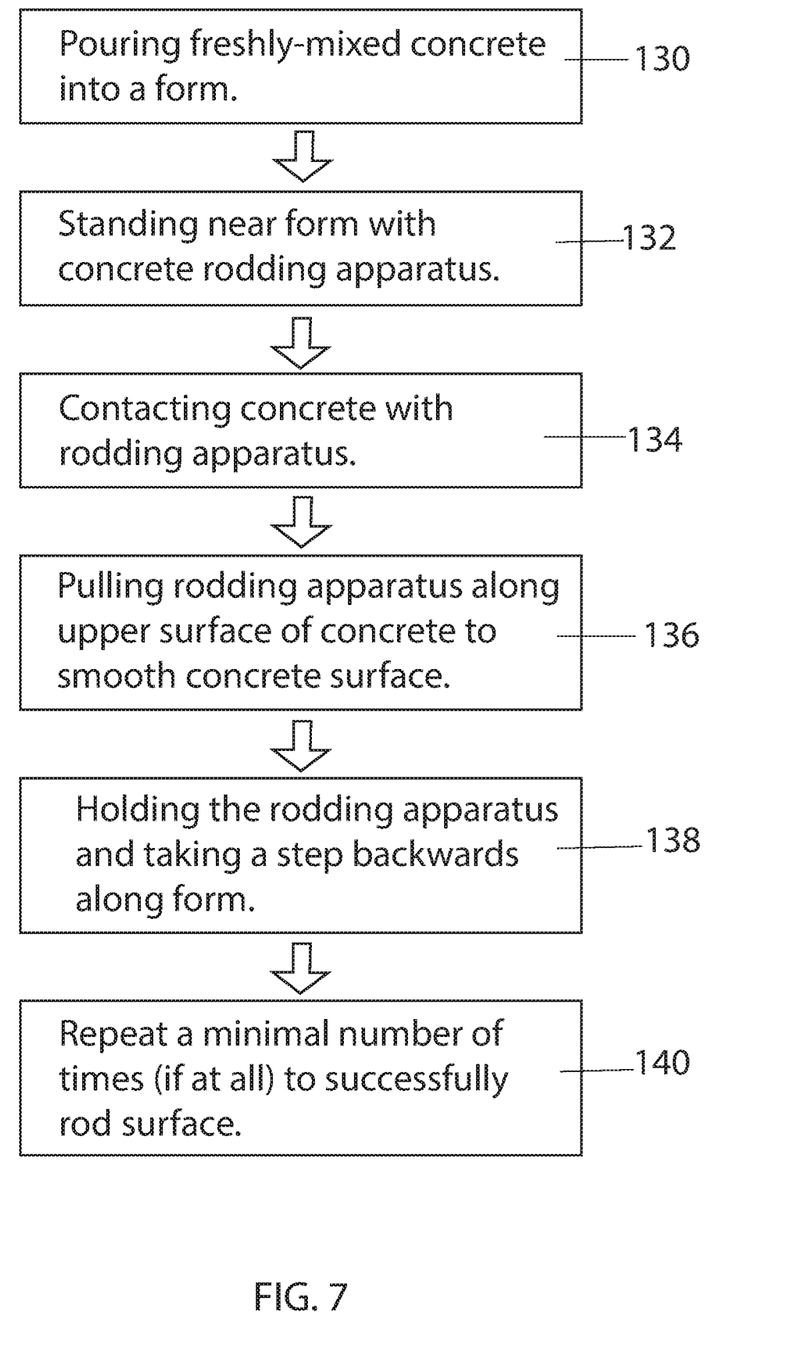
FIG. 7 is a flowchart showing specific steps involved in using the improved concrete rodding tool in a typical application.

Through significant testing by the Applicant, in accordance with another aspect of the disclosure, referring now to FIG. 7, there is provided an improved efficiency method of rodding a freshly-poured concrete pour within a form having first and second ends to form a smooth concrete surface before drying and curing of the concrete, comprising the steps of:
pouring freshly-mixed concrete into a form 130;
standing in or near the freshly-poured concrete near the first end of the form while holding an apparatus for rodding concrete 132, the apparatus comprising:
a rigid base member 102, 102', 102", 202 arranged for maintaining a tight tolerance of levelness along its length, adapted for connecting an additional working layer surface; and
a working layer 106, 106', 106", 206 on the rigid base member, comprising a durable material capable of being finished to a smooth surface suitable for direct contact with poured wet concrete;
extending the user's arms to reach and engage in contacting relationship the durable material on the apparatus to the poured wet concrete 134;
retracting the user's arms to pull the durable material partially within and along an upper surface of the poured wet concrete such that the concrete is smoothed by the durable material as it is pulled toward the user's feet 136;
taking a step rearwardly toward the second end of the form 138; and
repeating the previous three steps of the process a minimal number of times 140, if at all, to achieve a sufficiently smooth surface able to be successfully bull floated with a substantially lesser degree of effort compared to had the surface been rodded using a completely wooden, or completely metal, apparatus.

The improved efficiency method of this aspect of the disclosure is such that wherein the number of pulls to achieve the sufficiently smooth surface may be reduced by approximately one third as compared to the number of pulls necessary to achieve the same result with an average skilled and strength person, or person, using prior art methods.

Further, the method of this aspect of the disclosure is such that wherein the substantially lesser degree of effort to successfully bull float comprises approximately 50% less effort when compared with the effort necessary to successfully bull float by an average skilled and strength person using prior art methods.

Figure 8:
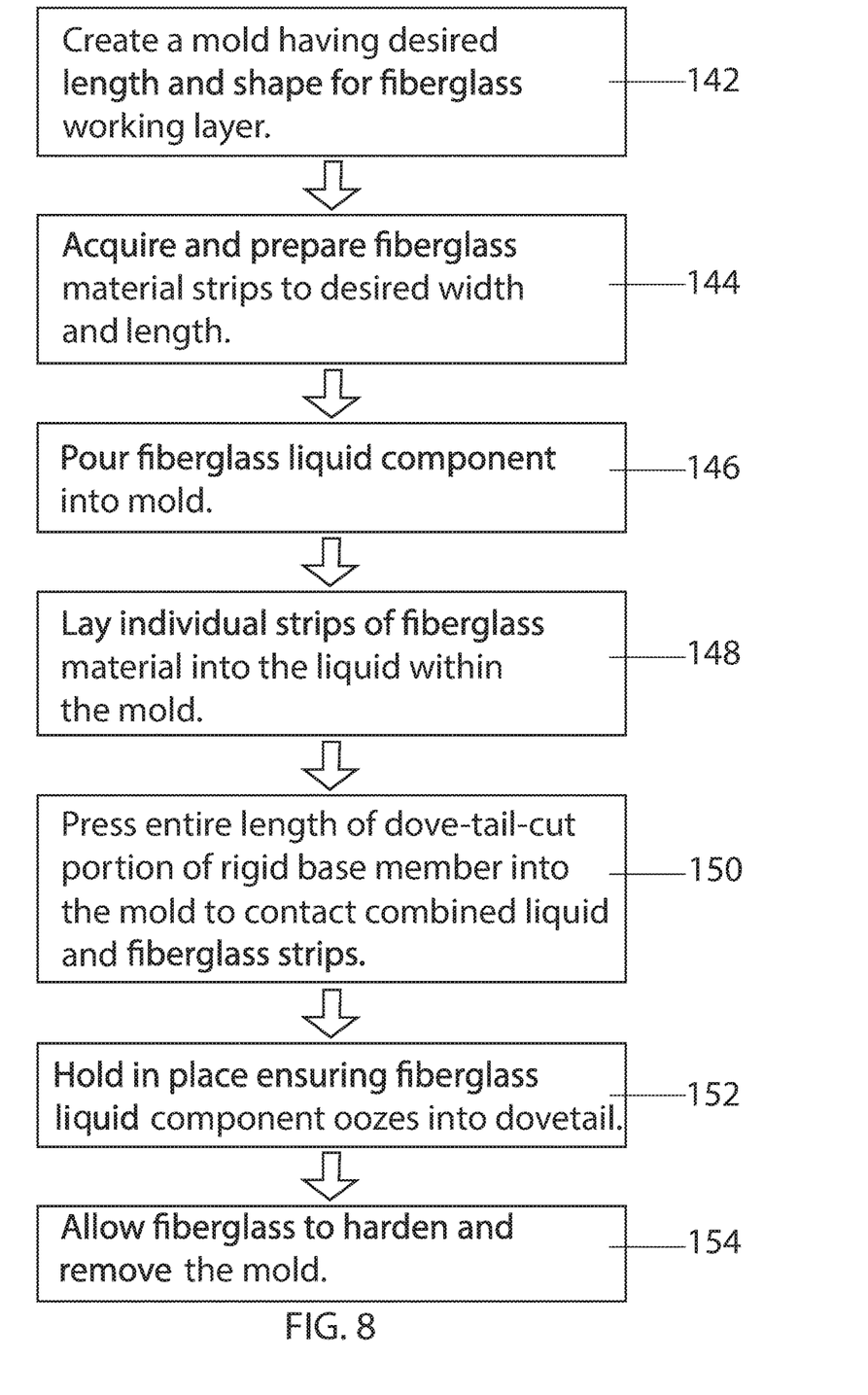
FIG. 8 is a flowchart showing specific steps involved in a method of manufacturing a rodding tool in accordance with the disclosure.

In accordance with another aspect of the disclosure, referring how to FIG. 8, there is provided an improved efficiency method of producing the improved rodding tool of the present disclosure, comprising the steps of:

creating a mold having the desired length and shape for a fiberglass working layer 142;

acquiring and preparing fiberglass material strips to a desired length and width 144;

pouring a fiberglass liquid component into the mold, where the liquid component may further comprise a resin 146;

laying individual strips (for example eight, or preferably eight such strips) of fiberglass material into the liquid component within the mold 148;

compressing the entire length of the dovetail cut portion of the rigid base member into the mold to contact combined liquid and fiberglass strips 150;

holding in place the rigid base member to ensure the fiberglass liquid component oozes into the mounting geometry (e.g., the dovetail groove 204 of FIG. 9A) 152; and allowing the fiberglass to harden and removing the mold 154.

The liquid component may include a resin material or other binding agent to facilitate the attachment of the fiberglass to the working layer. It is also possible for the rigid base member, or "blank" 2×4 or other structure which is made into the rigid base member, to be premanufactured out of wood or aluminum with the dovetail (or other shape) groove already in place to expedite the manufacturing process. The fiberglass material strips may be sequentially layer into the resin material already in the mold, and may be 8" by 1.5". As the strips are pressed into the mold, it may be necessary to work out any bubbles which form in the process, and to release the trapped air.

While preferred embodiments of the present invention have been shown and described, it will be apparent to those skilled in the art that many changes and modifications may be made without departing from the invention in its broader aspects. For example, it will be appreciated that one of ordinary skill in the art may mix and match the various components of the various embodiments of the invention without departing from the true spirit of the invention as claimed. Thus, for example, it will be appreciated that any of the structures 104, 104', 104", 204 may be formed into any type of base member 102, 102', 102", 202, 220 material without departing from the true spirit of the invention as claimed. The appended claims are therefore intended to cover all such changes and modifications as fall within the true spirit and scope of the invention.

What is claimed is:

1. An apparatus for rodding concrete, comprising:
   a. a rigid base member arranged for maintaining a tight tolerance of levelness along its length, adapted for connecting an additional working layer surface; and
   b. a working layer on said rigid base member, and further comprising a durable material capable of being finished to a smooth surface suitable for direct contact with poured wet concrete, wherein said rigid base member comprises a wood 2×4 having routed along the length of one of its narrower surfaces one of a stepped surface, a groove, a dovetail, and a dado-fin cut, wherein said working layer comprises a fiberglass working layer securely attached to said rigid base member along the routed narrower surface of said 2×4.

2. The apparatus of claim 1 wherein said rigid base member has a dovetail groove routed along the length of its routed narrower surface to securely attach said working layer to said rigid base member.

3. An apparatus for rodding concrete, comprising:
   a. a rigid base member arranged for maintaining a tight tolerance of levelness along its length, adapted for connecting an additional working layer surface; and
   b. a working layer on said rigid base member, and further comprising a durable fiberglass material capable of being finished to a smooth surface suitable for direct contact with poured wet concrete, wherein said rigid base member comprises an aluminum rod formed to a similar size and shape as a wood 2×4 having a structure formed in one of it narrower surfaces one of a stepped surface, a groove, a dovetail, and a dado-fin, to provide a secure mounting for said fiberglass working layer, further comprising a fiberglass working layer securely attached along the structure formed narrower surface of said aluminum rod.

4. The apparatus of claim 3 wherein said working layer has a prominence extending outward from the unfinished side of said working layer, which connects to securely attach said working layer to said rigid base member.

5. An apparatus for rodding concrete, comprising:
   a. a rigid base member arranged for maintaining a tight tolerance of levelness along its length, adapted for connecting an additional working layer surface; and
   b. a working layer on said rigid base member, and further comprising a durable fiberglass material capable of being finished to a smooth surface suitable for direct contact with poured wet concrete, wherein said rigid base member comprises a sturdy construction of plyboard or other processed structural wood, cut and glued to a similar size and shape as a wood 2×4, having routed along the length of its narrower surface one of a stepped surface, a groove, a dovetail, and a dado-fin cut, wherein said fiberglass working layer is securely attached to said rigid base layer along the routed narrower surface of said construction.

6. A process of making a rodding tool comprising the steps of:
   a. one of constructing a metal rod and planing and routing a piece of dimensional lumber, to comprise one of a smooth surface, a stepped surface, a dovetail surface, and a grooved surface, to be adapted for;
   b. one of painting and layering a fiberglass layer along the length of the piece of dimensional lumber; and
   c. curing the fiberglass layer to a degree of hardness suitable for working the fiberglass covered dimensional lumber to perform the rodding of a concrete pour with the rodding tool.

7. The process of claim 6 further comprising the steps of:
   a. creating a mold having the desired length and shape for the fiberglass working layer;
   b. acquiring and preparing fiberglass material strips to desired length and width;
   c. pouring a fiberglass liquid component into the mold;
   d. laying individual strips of fiberglass material into the liquid component within the mold;
   e. pressing the entire length of the dovetail surface of the lumber into the mold to contact the combined liquid and fiberglass strips;

f. holding the lumber in place to ensure the liquid component oozes into the dovetail surface; and g. allowing the fiberglass to harden and then removing the mold.

\* \* \* \* \*